United States Patent [19]

Schankler

[11] 3,999,818
[45] Dec. 28, 1976

[54] MODULAR STORAGE SYSTEM

[75] Inventor: Martin M. Schankler, East Brunswick, N.J.

[73] Assignee: Microfilm Enterprises Corporation, East Brunswick, N.J.

[22] Filed: June 20, 1975

[21] Appl. No.: 588,693

[52] U.S. Cl. .............................. 312/111; 312/107
[51] Int. Cl.² .................. F16B 12/00; A47B 87/00
[58] Field of Search .......... 312/111, 107, 108, 333

[56] References Cited

UNITED STATES PATENTS

| 2,593,998 | 4/1952 | Dupuis | 312/107 |
| 2,653,072 | 9/1953 | Press | 312/333 |
| 2,730,423 | 1/1956 | Mock | 312/333 |
| 3,131,829 | 5/1964 | Masser | 312/107 |
| 3,219,400 | 11/1965 | Bergquist | 312/107 |
| 3,514,170 | 5/1970 | Shewchuk | 312/111 |
| 3,552,817 | 1/1971 | Marcolongo | 312/111 |
| 3,563,624 | 2/1971 | Stice | 312/107 |
| 3,743,372 | 7/1973 | Ruggerone | 312/111 |
| 3,814,489 | 6/1974 | Clark et al. | 312/111 |

FOREIGN PATENTS OR APPLICATIONS

| 1,149,509 | 5/1963 | Germany | 312/107 |

Primary Examiner—Paul R. Gilliam
Assistant Examiner—Victor N. Sakran
Attorney, Agent, or Firm—Arthur L. Lessler

[57] ABSTRACT

An interlocking system of identical modules for storage of microfilm cartridges or boxes. The module is capable of being formed as a unitary member in a relatively inexpensive mold. The module has top, bottom, left side, right side and rear walls, and an open front. The top and bottom of the module have corresponding exterior projections and recesses of dovetail cross-section, and the left and right side walls also have dovetail projections and recesses on the exterior surfaces thereof which correspond with one another. The top of one module may be interlocked with the bottom of another module by engaging the adjacent projection and recess thereof. Similarly, a side wall of one module may be interlocked with the opposite side wall of another module. The rear surface of each module contains an arrangement of dovetail projections which is capable of interlocking with the left or right side wall of another module, thus permitting modules to be interlocked to form three dimensional arrays particularly suitable for use in carousel arrangements.

11 Claims, 5 Drawing Figures

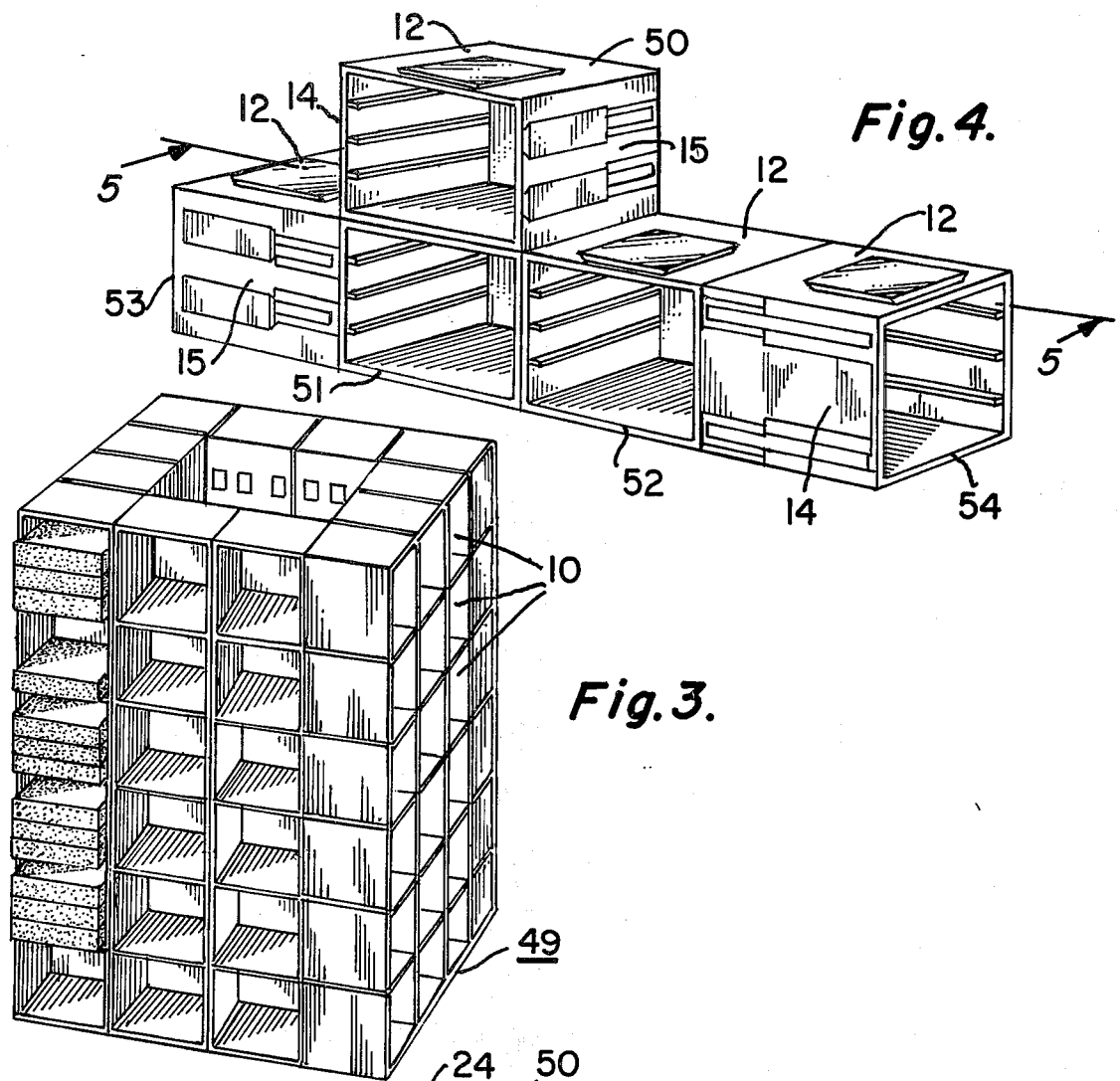
Fig. 4.
Fig. 3.
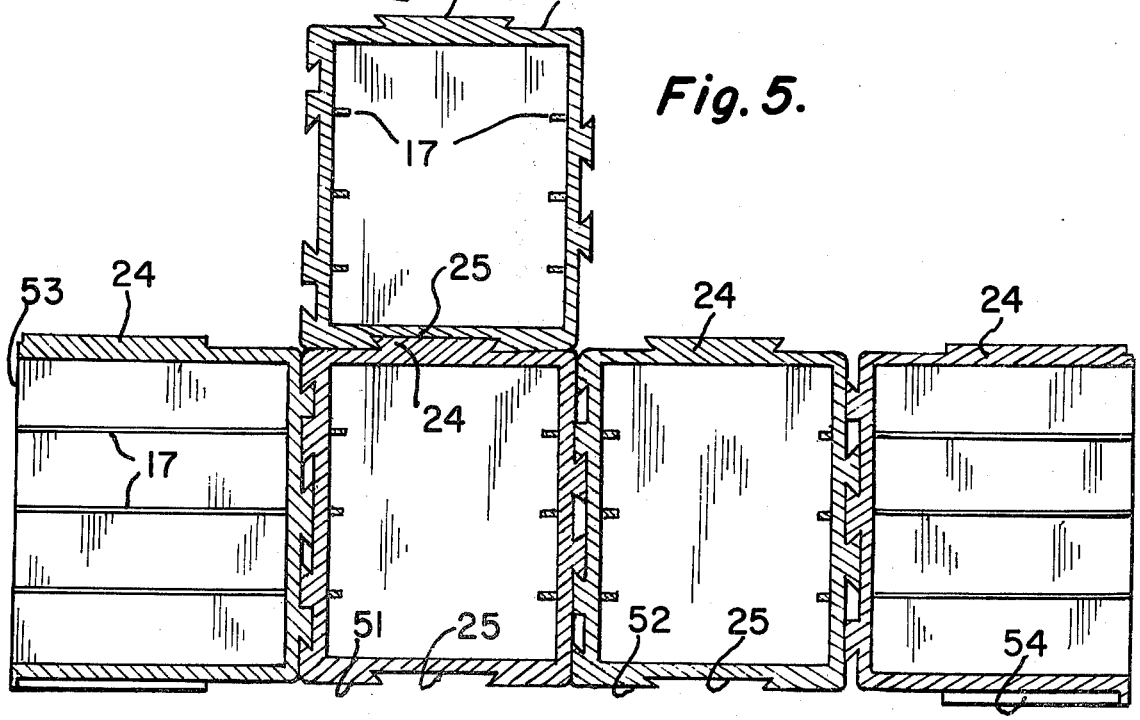
Fig. 5.

MODULAR STORAGE SYSTEM

This invention relates to a modular unit which is capable of interlocking with other such units in various ways to form an interlocked array of such units for storage or other purposes.

There is particular need for a flexible system for storing microfilm cartridges or boxes, so that as the user accumulates an increasing number of cartridges or boxes, the storage system can be expanded from time to time to accomodate the same. Various types of interlockable modules have been proposed for this purpose, or for other storage purposes. Typically, these modules have dovetail projections and recesses on opposite side walls thereof, so that by mating a projection on the exterior wall of one module with a corresponding recess on the exterior wall of another module, the modules may be interlocked. Typical of these arrangements are those shown in U.S. Pat. Nos. 3,514,170 and 3,856,369 as well as French Pat. Nos. 1,125,609 and 1,370,622. These arrangements, however, do not provide any means for interlocking the rear of the module with any of the other surfaces thereof, thus limiting the module to the formation of interlocking two dimensional arrays.

A modular structure which is capable of being interlocked with others of such modules for form a three dimensional array is shown in U.S. Pat. No. 3,836,218. However, this construction requires a separate connecting member to join adjacent modules, thus resulting in a more complex and expensive construction.

Another type of modular construction, shown in U.S. Pat. No. 3,529,879, also requires separate connecting elements to join the modules together, and is limited to expansion in a single direction, i.e. height.

Accordingly, an object of the present invention is to provide a modular construction having greater flexibility of use than the construction heretofore known, and enabling modules to be interlocked without the use of separate stacking or connecting elements.

As herein described, there is provided a modular unit capable of interlocking with others of such units, said unit having an end surface and a plurality of pairs of oppositely disposed walls secured to said end surface, at least two of said pairs of walls each comprising a first wall having at least one projection on the exterior surface thereof and a second opposite wall having an least one corresponding recess in the exterior surface thereof, said first and second walls having corresponding interlocking cross-sections, so that the first wall of one of said units may be interlocked with the second wall of another of said units, and interlocking means associated with said end surface for interlocking with said first and second walls, so that the end surface of one of said units may be interlocked with a selected one of said first and second walls of at least one of said pairs of walls.

In the drawing:

FIG. 3 shows a three dimensional carousel microfilm storage array formed by interlocking a number of holders of the type shown in FIGS. 1 and 2;

FIG. 4 shows an arrangement of five interlocked holders, each of the type shown in FIGS. 1 and 2; and FIG. 5 shows a front cross-sectional view of the arrangement of interlocked holders shown in FIG. 4.

Figure 1:
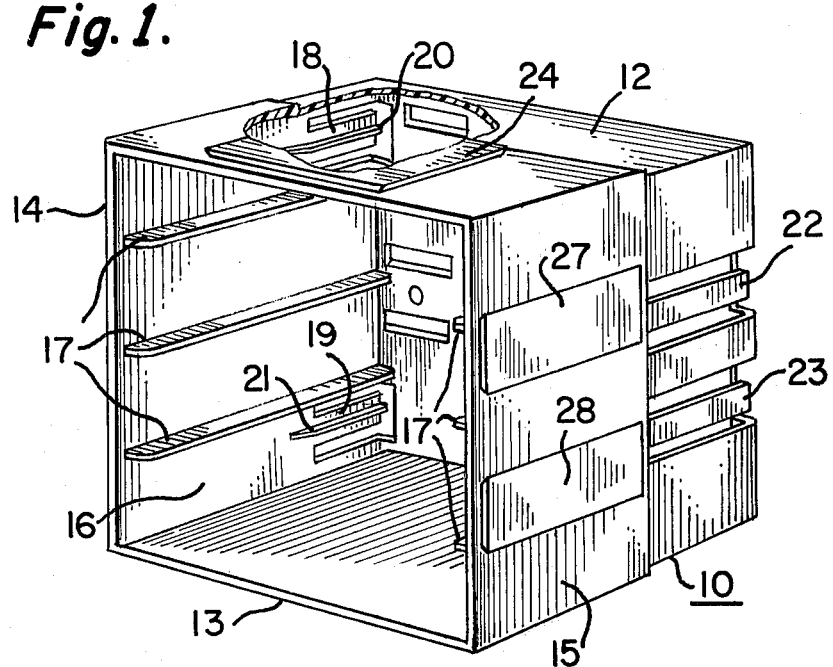
FIGS. 1 and 2 show isometric views of a microfilm cartridge or box holder according to a preferred embodiment of the present invention.
Figure 2:
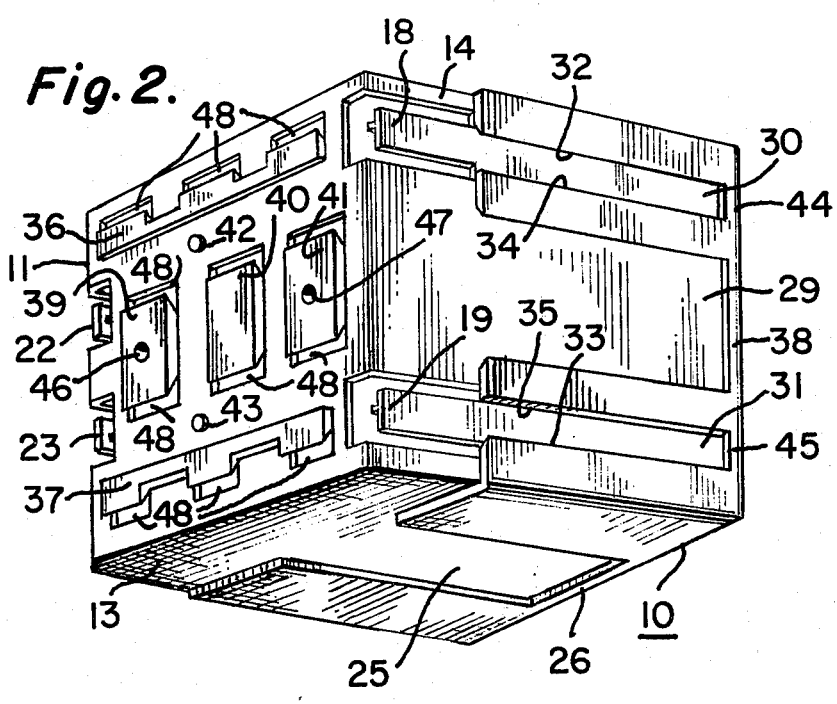

As shown in FIGS. 1 and 2, the microfilm cartridge or box holder 10 has a rear surface 11, a top section 12, a bottom section 13, a left side 14 and a right side 15. The holder 10 has an open front portion 16 into which microfilm cartridges and boxes may be inserted for storage purposes, the boxes being guided and supported by the lips 17 which protrude from the interior surfaces of the left and right side walls 14 and 15.

Formed in the left side wall 14 of the holder 10 are cantilevered spring members 18 and 19, having tapered projections 20 and 21 thereon respectively, so that upon inserting a microfilm cartridge or box into the corresponding area of the holder 10, the tapered projections 20 and 21 are outwardly deflected. The resulting restoring forces generated by the corresponding spring members 18 and 19 urge the inserted cartridge or box against the opposite side wall 15 of the holder 10, thus retaining the cartridge or box in its inserted position.

Similarly, spring members 22 and 23 are formed as cantilevered portions of the right side wall 15 of the holder 10 and, upon insertion of microfilm cartridges or boxes into the adjacent regions of said holder, are deflected so as to urge the inserted cartridges or boxes against the opposite side wall 14, thereby retaining the same in their inserted positions.

Disposed on the exterior surface of the top section 12 of the holder 10 is a raised rectangular shaped flattened projection 24 having a dovetail cross-section. A rectangular shaped recess 25 having a dovetail cross-section corresponding to the shape of projection 24 is disposed in the exterior surface of the bottom section 13 of the holder 10. Thus the top section 12 of one of the holders 10 may be interlocked with the bottom section 13 of a similar holder by engaging the projection 24 with the recess 25. A forward lip 26 adjacent the recess 25 acts as a stop means, to insure proper alignment of the open front portions 16 of the holders when they are so interlocked.

Disposed on the exterior surface of the right side wall 15 of the holder 10 is a first pair of parallel raised rectangular shaped flattened projections 27 and 28, each having a dovetail cross-section.

Disposed on the exterior surface of the left side wall 14 of the holder 10 are a central rectangular shaped recess 29 and two parallel rectangular shaped peripheral recesses 30 and 31. The central recess 29 has a dovetail cross-section and the peripheral recesses 30 and 31 have cross-sections which for purposes of the specification and claims of this application will be referred to as dovetail cross-sections, although these cross-sections are actually of a hybrid type. That is, the upper edge 32 of the recess 30 and the lower edge 33 of the recess 31 each have a dovetail cross-section, while the lower edge 34 of the recess 30 and the upper edge 35 of the recess 31 have flat, i.e., not dovetail, cross-sections.

The central recess 29 has a cross-section corresponding to the overall outline of the pair of projections 27 and 28, i.e. the distance between the dovetail edges of the recess 29 is equal to the distance between the upper dovetail edge of the projection 27 and the lower dovetail edge of the projection 28. Thus, the left side 14 of one of the holders 10 can be interlocked with the right side 15 of another of such holders by engaging the projections 27 and 28 with the recess 29. A forward lip 38 adjacent the recess 29 acts as a stop means to provide proper alignment of the open front portions 16 of the interlocked holders 10 when so joined.

Disposed on the exterior of the rear surface 11 of the holder 10, between the parallel raised rectangular shaped flattened projections 36 and 37, are three central raised rectangular shaped flattened projections 39, 40 and 41. Each of the projections 39, 40 and 41 has a dovetail cross-section, and a shape, i.e. vertical dimension, corresponding to the shape of the space between the projections 27 and 28, so that the rear surface 11 of one of the holders 10 can be interlocked with the right side wall 15 of another of such holders by engagement of the central projections 39, 40 and 41 between the lower edge of the projection 27 and the upper edge of the projection 28. Cylindrical projections 42 and 43 on the rear surface 11 act as stop means and, by engaging the rearward end of the projections 27 and 28, ensure proper alignment of the open front portions of the holders 10 when so interlocked.

The rear surface 11 of one of the holders 10 may be interlocked with the left side wall 14 of another of such holders by engagement of the projections 36 and 37 with the recesses 30 and 31 respectively. When this is done the forward lip regions 44 and 45 of the left side wall 14 act as stop means to ensure proper alignment of the open front portions 16 of the interlocked modules.

Screw holes 46 and 47 are provided in the rear central projections 39 and 41 respectively. The end of the hole 46 adjacent the interior of the holder 10 is countersunk, while neither end of the hole 47 is countersunk. This arrangement permits the joining of two of the holders 10 back-to-back by means of screws inserted through the holes 46 and 47, one screw being inserted from the interior of each module.

Relief holes or recesses 48 are provided adjacent the dovetail portions of the rear surface projections 36, 37, 39, 40 and 41. These recesses permit the dovetail portions of the rear surface projections to be formed at the same time as all other portions of the holder 10 in a single operation, utilizing a relatively inexpensive two piece mold. One piece of the mold defines the entire interior structure of the holder 10, and extends through the relief holes or recesses 48 to form the dovetail edges of the rear surface projections. The other portion of the mold defines all exterior features of the holder 10. Without the relief holes 48, it would not be possible to form the rear surface projections, with the required dovetail edges, with a mold having only two pieces, since there would then be no way to separate the mold parts without damaging the holder 10. At least a three piece mold would be required without the aforementioned relief holes 48, resulting in substantially increased cost of making and using the mold.

Thus, the holder 10 shown in FIGS. 1 and 2 is capable of being manufactured as a unitary structure, i.e. consisting entirely of a single piece of material, by means of a relatively inexpensive two piece mold. A suitable material for manufacturing the holders 10 is a relatively rigid plastic such as acrylonitrilebutadienestyrene, commonly known as ABS.

FIG. 3 illustrates the manner in which a number of the holders 10 may be interlocked to form a three dimensional carousel structure. This arrangement may be placed upon a disc-shaped bearing or other rotating support to provide a highly convenient and flexible storage system, particularly suitable for microfilm cartridges and boxes.

FIG. 4 shows five of the holders 10 interlocked with one another at various interfaces, to illustrate the various types of interlocking joints which are available. The three central units 50, 51 and 52 are shown facing forward, with the left hand unit 53 facing to the left side and the right hand unit 54 facing to the right side. A front cross-sectional view of the five modules of FIG. 4, showing the interlocking of the various projections and recesses thereof, appears in FIG. 5.

As shown in FIGS. 4 and 5, the modules 50 and 51 are joined to one another by interlocking of the top section projection 24 of the module 51 with the bottom section recess 25 of the module 50. The modules 51 and 52 are joined to one another by interlocking of the right side projections 27 and 28 (see FIG. 1) of the module 51 with the left side central recess 29 (see FIG. 2) of the module 52. The right side of the module 52 and the rear surface of the module 54 are joined to one another by interlocking of the central projections 39, 40 and 41 of the rear surface 11 (see FIG. 2) of the module 54 with the space between the projections 27 and 28 on the right side wall 15 (see FIG. 1) of the module 52. The left side of the module 51 and the rear of the module 53 are joined to one another by interlocking of the rear projections 36 and 37 (see FIG. 2) of the module 53 with the respective peripheral recesses 30 and 31 in the left side wall 14 (see FIG. 2) of module 51.

Thus, it is seen that there has been provided a modular unit of great structural flexibility, which can be manufactured relatively inexpensively by means of a two piece mold.

The invention herein described may be utilized for purposes other than storing microfilm boxes and cartridges. Obviously the modules herein described could be utilized for any desired storage purpose, or for purposes not involving storage. The front portion of each module need not necessarily be open, but could, by appropriate manufacturing methods, be provided with doors, drawers, or permanently closed members.

It is not necessary for the various projections and mating recesses of the module 10 to have dovetail cross-sections. These projections and recesses may have any interlocking cross-sections, i.e., cross-sections which cooperate to form interlocking sliding ways to retain coupled modules in interlocked relationship. Such interlocking cross-sections may include semi-dovetails, a rod structure mating with a cross head bent around the rod, T-guide bar and glide, and T slot. Other suitable interlocking cross-sections are illustrated in "The Engineer's Illustrated Thesaurus" by Herbert Herkimer, Copyright 1952, Chemical Publishing Co., Inc., New York, New York at pages 142 through 145.

It is not necessary that all of the interlocking cross-sections of the projections and recesses of a given module 10 be identical. Rather, it is only necessary that those projections and recesses which are adapted to mate with one another have corresponding cross-sections.

Other embodiments of the invention will be apparent to those skilled in the art. For example, since the rear surface 11, the left side wall 14 and the right side wall 15 can be interlocked with one another, i.e. one of said surfaces on one holder may be coupled to another of said surfaces on another holder, it is apparent that the projections and recesses, i.e., the relief regions on these surfaces may be interchanged in any desired manner without affecting the versatility or operation of the holder 10.

Thus the relief region, i.e. the projections 36, 37, 39, 40 and 41, of the rear surface 11 could be interchanged with the relief region (i.e. the projections 27 and 28) of of the right side wall 15 or the relief region (i.e. the recesses 29, 30 and 31) of the left side wall 14; or the latter two relief regions could be interchanged with one another. It is also apparent that the projection and corresponding recess of any pair of such regions adapted to mate with one another could be interchanged without adversely affecting the operation of the holder 10. For example, the projections 36 and 37 could be interchanged with the recesses 30 and 31.

It should also be apparent that other arrangements of interlocking regions than those herein described may be employed without departing from the spirit and scope of the invention. The essential feature is that a container be provided which has a common end surface, such as the rear surface 11, to which are secured a plurality of pairs of oppositely disposed surfaces (such as the pair comprising the top section 12 and the bottom section 13; and the pair comprising the left side wall 14 and the right side wall 15); that at least two of said pairs contain interlockable relief regions on their exterior surfaces, so that one region of one member of a pair on one module can be interlocked with the corresponding region of the other member of the pair on another module; and that the common end surface have a relief region which is capable of interlocking with either surface of one of the aforementioned pairs.

It should also be clearly understood that the terms "top", "bottom", "left", "right" and "rear" as herein employed are used in a relative and not an absolute sense, and are not to be interpreted as limiting the scope of the claims as applied to structures with respect to which other reference terms are employed.

I claim:

1. A unitary holder for cartridges and boxes capable of interlocking with others of such holders, said holder having a rear surface, top and bottom sections, left and right sides, and an open front portion into which cartridges and boxes may be inserted, said holder comprising:
    a raised rectangular-shaped flattened projection having a dovetail cross-section disposed on the exterior surface of one of said sections;
    a rectangular-shaped recess having a dovetail cross-section corresponding to the shape of said projection disposed in the exterior surface of the other of said sections;
    a first pair of parallel raised rectangular-shaped flattened projections, each having a dovetail cross-section, disposed on the exterior surface of one of said sides;
    a relatively central rectangular-shaped recess and two parallel rectangular-shaped relatively peripheral recesses, said central and peripheral recesses having dovetail cross-sections and being disposed in the exterior surface of the other of said sides, said central recess having a cross-section corresponding to the overall outline of said pair of projections;
    at least one relatively central raised rectangular-shaped flattened projection having a dovetail cross-section corresponding to the shape of the space between said pair of parallel raised projections, said central projection being disposed on the exterior of said rear surface; and
    a second pair of parallel raised rectangular-shaped flattened projections, each having a dovetail cross-section corresponding to the shape of one of said peripheral recesses, disposed on the exterior of said rear surface on opposite sides of said central projection.

2. The holder according to claim 1, further comprising stop means on said rear surface, one of said sections and one of said sides.

3. The holder according to claim 1, wherein the projections and recesses of said sections and sides extend from points adjacent the open front portion of said holder toward said rear surface, and terminate a substantial distance from said rear surface.

4. The holder according to claim 1, further comprising spring means disposed in at least one wall of said holder, other than said rear surface, for urging items inserted into said holder against the opposite wall thereof.

5. The holder according to claim 4, wherein said spring means comprises a cantilevered portion of said one wall.

6. The holder according to claim 1, wherein said rear surface has recesses therein adjacent the dovetail portions of the projections disposed on the exterior of said rear surface, to facilitate the manufacture of said holder by a molding process.

7. The holder according to claim 1, comprising at least two of said central raised projections on the exterior of said rear surface, each of said projections having a hole extending therethrough, the end of only one of said holes adjacent the interior of said holder being countersunk.

8. A modular unit capable of interlocking with others of such units, said unit having a rear surface, top and bottom sections, left and right sides, and a front portion, said unit comprising:
    a raised rectangular-shaped flattened projection having an interlocking cross-section disposed on the exterior surface of one of said sections;
    a rectangular-shaped recess having an interlocking cross-section corresponding to the shape of said projection disposed in the exterior surface of the other of said sections;
    a first pair of parallel, raised rectangular-shaped flattened projections, each having an interlocking cross-section, disposed on the exterior surface of one of said sides;
    a first rectangular-shaped recess and second and third parallel rectangular-shaped recesses, said first, second and third recesses having interlocking cross-sections and being disposed in the exterior surface of the other of said sides, said first recess having an interlocking cross-section corresponding to the overall outline of said pair of projections;
    at least one fourth raised rectangular-shaped flattened projection having an interlocking cross-section corresponding to the shape of the space between said pair of parallel raised projections, said fourth projection being disposed on the exterior of said rear surface; and
    fifth and sixth parallel raised rectangular-shaped flattened projections, each having an interlocking cross-section corresponding to the shape of one of said second and third recesses, said fifth and sixth projections being disposed on the exterior of said rear surface.

9. The unit according to claim 8, further comprising stop means on said rear surface, one of said sections and one of said sides.

10. The unit according to claim 8 wherein all said interlocking cross-sections are of dovetail configuration.

11. The unit according to claim 10 further comprising spring means disposed in at least one wall of said unit, for retaining in position items inserted into said unit.

* * * * *